United States Patent
Merbach et al.

(10) Patent No.: US 8,630,520 B2
(45) Date of Patent: Jan. 14, 2014

(54) OPTICAL TRANSMISSION ELEMENT

(75) Inventors: Gerhard Merbach, Neustadt bei Coburg (DE); Waldemar Stöcklein, Coburg (DE); Günter Wünsch, Neustadt bei Coburg (DE)

(73) Assignee: CCS Technology, Inc., Wilmington, DE (US)

( * ) Notice: Subject to any disclaimer, the term of this patent is extended or adjusted under 35 U.S.C. 154(b) by 514 days.

(21) Appl. No.: 12/819,104

(22) Filed: Jun. 18, 2010

(65) Prior Publication Data
US 2010/0322574 A1 Dec. 23, 2010

(30) Foreign Application Priority Data
Jun. 22, 2009 (EP) ................... 09163404

(51) Int. Cl.
*G02B 6/00* (2006.01)
*G02B 6/36* (2006.01)
(52) U.S. Cl.
USPC .......................................... 385/102; 385/147
(58) Field of Classification Search
USPC .............. 385/100, 101, 102, 103, 104, 147; 264/1.28
See application file for complete search history.

(56) References Cited

U.S. PATENT DOCUMENTS

| 6,853,780 B1 * | 2/2005 | Brandi et al. ................. 385/104 |
| 7,349,607 B2 * | 3/2008 | Schneider et al. ............ 385/102 |
| 7,397,991 B1 | 7/2008 | Register ........................ 385/102 |
| 7,471,861 B2 * | 12/2008 | Schneider et al. ............ 385/102 |
| 7,599,590 B2 * | 10/2009 | Stocklein et al. ............. 385/110 |
| 7,668,427 B2 | 2/2010 | Register ........................ 385/102 |
| 7,995,885 B2 | 8/2011 | Register ........................ 385/102 |
| 8,074,596 B2 * | 12/2011 | Knoch et al. .................. 118/420 |
| 2005/0018983 A1 | 1/2005 | Brown et al. .................. 385/102 |
| 2009/0136188 A1 | 5/2009 | Stoecklein et al. ........... 385/110 |

FOREIGN PATENT DOCUMENTS

| DE | 102006018536 | 10/2007 |
| EP | 1018662 A2 | 7/2000 |
| EP | 1310814 A1 | 5/2003 |
| EP | 1600802 A2 | 11/2005 |

OTHER PUBLICATIONS

European Patent Office Communication, Application No. 09163404.8, Jan. 04, 2011, 2 pages.
Response to European Patent Office Communication, Application No. 09163404.8, Jun. 27, 2011, 14 pages.
European Patent Office Communication, Application No. 09163404.8, Jun. 06, 2012, 5 pages.
Response to European Patent Office Communication, Application No. 09163404.8, Oct. 05, 2012, 13 pages.

* cited by examiner

*Primary Examiner* — Akm Enayet Ullah
(74) *Attorney, Agent, or Firm* — Russel S. Magaziner

(57) ABSTRACT

An optical transmission element comprises a core section including a plurality of optical fibers where each one of the optical fibers is in contact with at least two other optical fibers. The optical transmission element also has a sheath section including a sheath layer surrounding the core section such that the sheath layer is in contact with the optical fibers.

17 Claims, 4 Drawing Sheets

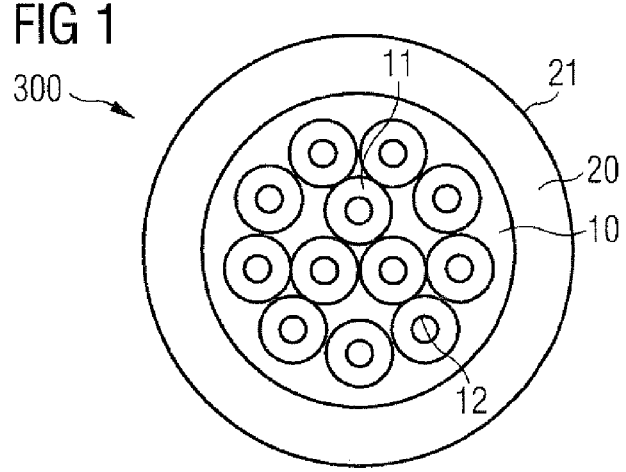
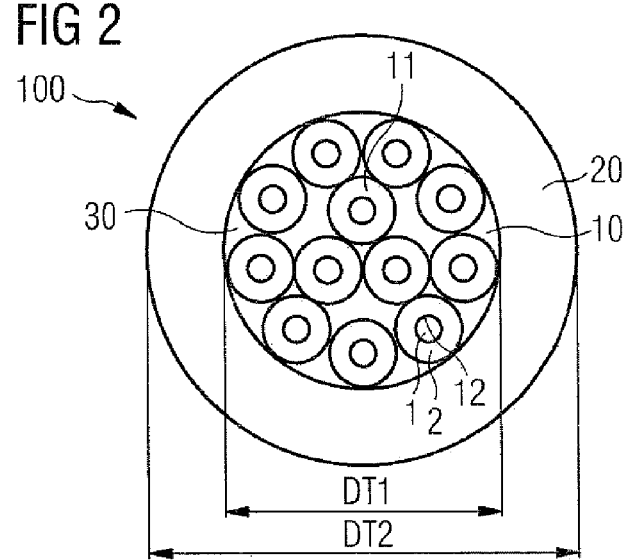
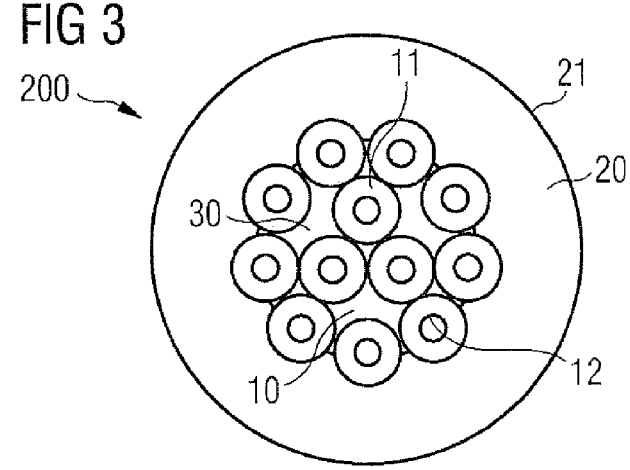

OPTICAL TRANSMISSION ELEMENT

PRIORITY APPLICATION

This application claims the benefit of European Application No. 09163404.8 filed Jun. 22, 2009, the entire contents of which are herein incorporated by reference.

TECHNICAL FIELD

An optical transmission element which may be provided within a fiber optic cable to transmit optical signals is described. Furthermore, a method for manufacturing the optical transmission element is described hereinafter.

BACKGROUND

Optic cables comprise a large number of optical fibers which may be grouped into sub-units of optical transmission elements. Each of the optical transmission elements contains a bundle of the optical fibers which are surrounded by a polymeric tube. The tube may be formed around the optical fibers by an extrusion process. By way of example, each of the tubes of an optic cable can be filled with fiber counts up to 36. To identify the individual fibers within the tube, fibers are colored and additionally coded with marks. The tubes are limited in their bend performance because of the stiffness of the material provided for the tubes. Furthermore, the strength of the material of the tubes prevents an easy access to the individual optical fibers housed within the tubes. Hence, to access individual optical fibers within the tube a tool, for example a knife or a razor plate, has to be used to slit the tube so that a single optical fiber can be taken out of the cable.

During the last years high-speed data transmission has become more and more important. Especially in data centers huge amounts of data are exchanged between servers with bit rates of up to several 10 Gb. An increase of the speed of transmission can be provided by transmitting bits via the optical fibers in a parallel manner. Assuming an optical transmission element containing twelve optical fibers, this technique allows that data are transmitted parallel over the twelve optical fibers. In high-speed data networks a time delay (skew) between different bits transferred via the optical fibers of an optical transmission element of a fiber optic cable is usually not allowed to be larger than 0.75 ns when data are transmitted via an optical cable having a length of 300 m. This is a very stringent requirement for standard optical transmission elements.

The requirements concerning the low time delay between signals which have to be transferred parallel via different optical fibers may currently only be fulfilled with fiber optic ribbons. A fiber optic ribbon comprises a large number of up to 36 optical fibers which are arranged in a horizontal plane and embedded in an acrylate matrix material. However, fiber optic ribbons have a limited bend performance and, hence, the use of fiber optic ribbons is generally avoided if the cables have to be used for indoor applications wherein the cables often have to be installed in buildings around corners.

There is a demand to provide an optical transmission element being highly flexible which allows a parallel data transmission via the optical fibers of the optical transmission element with a low time delay of signals transferred via different optical fibers of the optical transmission element. Furthermore, it is desirable to specify a method for manufacturing an optical transmission element which is highly flexible and which allows a parallel data transmission via the optical fibers with a low time delay between different optical fibers of the optical transmission element.

SUMMARY

According to an embodiment of an optical transmission element, the optical transmission element comprises a core section including a plurality of optical fibers wherein each one of the optical fibers is in contact with at least two other ones of the optical fibers. Furthermore, the optical transmission element comprises a sheath section comprising a sheath layer surrounding the core section such that the sheath layer is in contact with the optical fibers.

According to the embodiment of the optical transmission element, the optical fibers are packed within the core section of the optical transmission element with a high density. To obtain the high packing density the sheath layer is extruded in contact with the optical fibers being arranged in the core section of the optical transmission element next to the inner surface of the sheath layer. Each of the optical fibers is in contact which each of its adjacent optical fiber. Furthermore, each of the optical fibers being disposed in an outer area of the core section of the optical transmission element is also in contact with the material of the sheath layer due to the high packing density. Consequently, the optical fibers are coupled by each other and are also coupled to the sheath layer.

In contrast to a loose configuration of optical fibers in which the optical fibers are disposed so that not all of the outer optical fibers are in contact with the sheath layer, the optical transmission element does not show any free space between the outer optical fibers and the sheath layer. Therefore, the optical fibers are arranged in the core section of the optical transmission element in a straight manner which allows to minimize microbending effects within the core section. The individual optical fibers have an optical length variation of less than 0.05%. That means that optical signals may be transferred parallel via the optical fibers of an optical transmission element with a low time delay (skew) of less than 2.5 ps/m between optical signals or bits transferred via different fibers of the optical transmission element.

The optical transmission element may comprise first and second ones of the optical fibers. First ones of the optical fibers are surrounded by second ones of the optical fibers. The sheath layer is in contact with the second ones of the optical fibers.

According to another embodiment, the sheath layer is disposed around the core section by an extrusion process performed by an extruder comprising a nozzle having an inner tube and an outer tube surrounding the inner tube. The inner tube has an opening with a first diameter and the outer tube has an opening with a second diameter. A relation between the first diameter and the second diameter is between 1.5:2.1 and 1.5:2.5. According to another embodiment of the fiber optic cable the sheath layer is disposed around the core section by an extrusion process performed by an extruder comprising a nozzle having an inner tube and an outer tube surrounding the inner tube. The inner tube has an opening with a first diameter and the outer tube has an opening with a second diameter. The extruder is configured so that a relation of a first quotient formed between the second diameter and the first diameter and a second quotient formed between an outer diameter of the sheath layer and a diameter of the core section is larger than 1.0. In one embodiment the quotient is in a range of between 1.1 to 1.3.

As concerns the dimension of the sheath layer, the sheath layer may have an outer diameter of between 1.25 mm and 1.35 mm and an inner diameter of between 1.0 mm and 1.10 mm.

The core section may include a gel or a material of chalk or a water-swellable material. The optical fibers may be embedded in the gel or in the material of chalk or in the water-swellable material.

The sheath layer may contain a composition of material including ethyl methyl acetate, linear low density polyethylene, anorganic fillers and stabilizers.

According to another embodiment of the optical transmission element, the sheath layer is formed in connection around the second ones of the optical fibers such that the optical fibers have an optical length variation of less than 0.05%/m. The optical fibers are arranged in the core section such that a time delay between optical signals transferred via different ones of the optical fibers is lower than 2.5 ps/m.

A force which is needed to pull the optical fibers out of the core section of a segment of the optical transmission element of 1 m is between 4 N to 10 N. If an embodiment of the optical transmission element is considered wherein the core section comprises twelve optical fibers, the sheath layer surrounds the optical fibers such that an area of the core section occupied by the optical fibers is 68% of the area of the core section which is surrounded by the sheath layer.

According to a method for manufacturing an optical transmission element, a plurality of optical fibers is provided. The optical fibers are disposed so that each one of the optical fibers is in contact with at least two other ones of the optical fibers. A sheath layer is extruded around the plurality of optical fibers such that the sheath layer is in contact with the optical fibers.

According to another embodiment of the method, the plurality of optical fibers is disposed such that first ones of the optical fibers are surrounded by second ones of the optical fibers. The sheath layer is extruded around the plurality of optical fibers such that the sheath layer is in contact with the second ones of the optical fibers.

An extruder may be provided to extrude a material around the optical fibers to form the sheath layer. The extruder may comprise a nozzle having an inner tube and an outer tube, the outer tube surrounding the inner tube. The inner tube has an opening with a first diameter and the outer tube has an opening with a second diameter. The extruder is configured so that a relation between the first diameter and the second diameter is between 1.5:2.1 and 1.5:2.5. A material is extruded out of a slit of the extruder formed between the inner tube and the outer tube to dispose the sheath layer around the optical fibers.

According to another embodiment, an extruder is provided comprising a nozzle having an inner tube and an outer tube, the outer tube surrounding the inner tube. The inner tube has an opening with a first diameter and the outer tube has an opening with a second diameter. The extruder is configured so that a relation of a first quotient formed between the second diameter and the first diameter and a second quotient formed between an outer diameter of the sheath layer and a diameter of the core section is larger than 1.0, and is preferably in a range of between 1.1 to 1.3. A material is extruded out of a slit of the extruder formed between the inner tube and the outer tube to dispose the sheath layer around the optical fibers.

It is to be understood that both the foregoing general description and the following detailed description present embodiments of the optical transmission element and the method for manufacturing the optical transmission element, and are intended to provide an overview or framework for understanding the nature and character of the optical transmission element and method for manufacturing as it is claimed.

BRIEF DESCRIPTION OF THE DRAWINGS

Embodiments of the optical transmission element, the fiber optic cable and the method for manufacturing the optical transmission element are illustrated by the following Figures, in which:

FIG. 1 shows an embodiment of an optical transmission element of a fiber optic cable including optical fibers surrounded by a sheath layer;

FIG. 2 shows an embodiment of an optical transmission element including optical fibers being in contact with a sheath layer surrounding the optical fibers;

FIG. 3 shows an embodiment of an optical transmission element including optical fibers being embedded in a material of a sheath layer surrounding the optical fibers;

DETAILED DESCRIPTION

Figure 4:
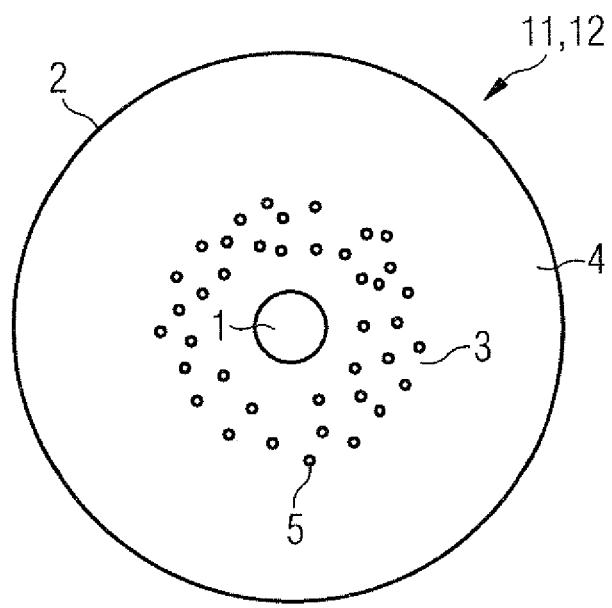
FIG. 4 shows an embodiment of an optical fiber.

FIG. 1 shows an embodiment of an optical transmission element 300 of a fiber optic cable comprising optical fibers 11, 12 which are surrounded by a sheath section 20. A sheath layer 21 of the sheath section 20 may be formed around the core section 10 of the optical transmission element by an extrusion process. The sheath layer 21 may be extruded in the form of a tube so that a free space is provided between the outer optical fibers 12 being arranged adjacent to the inner surface of the sheath layer 21.

According to the embodiment of the optical transmission element 300 the optical fibers 11, 12 are loosely arranged within the core section 10. The optical fibers may also be embedded in a gel. The gel may be disposed between the optical fibers and the sheath layer 21. The sheath layer 21 is extruded with a distance in relation to at least some of the outer optical fibers being disposed in an outer area of the core section to avoid any pressure lateraly affecting the optical fibers 11, 12. The individual fibers can move against each other within the core section because of their loose configuration. Different tensile forces exerted to the optical fibers during manufacturing cause a slightly different mechanical length of the individual optical fibers within the core section. The length variation of the optical fibers may be between 0.1% to 0.2% per meter and thus can lead to a skew of signals transmitted via the optical fibers of up to 10 ps per meter.

FIG. 2 shows an embodiment of an optical transmission element 100 of a fiber optic cable wherein optical fibers 11, 12 arranged within a core section 10 of the optical transmission element are encapsulated by a sheath layer 21 of a sheath section 20 of the optical transmission element. First inner ones of the optical fibers which are marked with reference number 11 are surrounded by second outer ones of the optical fibers which are marked with reference number 12. The outer optical fibers 12 are positioned closer to the sheath layer 21, i.e. closer to the inner surface of the sheath layer 21, than the inner optical fibers 11. The outer optical fibers are disposed so that no further one of the optical fibers is disposed between one of the outer optical fibers and the sheath layer. The sheath layer 21 surrounds the core section 10 such that all of the outer optical fibers 12 being disposed in an outer area of the core section are in contact with the sheath layer 21.

Furthermore, the sheath layer 21 exerts a force towards the optical fibers so that the optical fibers are also held in contact with each other. The sheath layer 21 is extruded tightly around the optical fibers such that the optical fibers are packed within the core section of the optical transmission element with high density so that each one of the optical fibers is in contact with at least two other ones of the optical fibers. The embodiment of the optical transmission element 200 as illustrated in FIG. 2 allows that the optical fibers 11 and 12 are coupled to each other and the optical fibers 12 are in contact with the inner surface of the sheath layer 21.

The optical fibers 11, 12 may be embedded in a filler material 30, such as a gel. The gel prevents that forces exerted to the sheath layer 21 are directly transmitted to the optical fibers 11, 12. Furthermore, the gel blocks an ingress of water and prevents that moisture extends along the optical fibers. According to another embodiment the optical transmission element has a dry core section so that the optical fibers are not embedded in gel. However, the core section may contain a water swellable-material. The water-swellable material ensures that, in case of an ingress of water, an expansion of water in a longitudinal direction of the fibers is blocked. The optical fibers may also be embedded in a material of chalk. In particular, the chalk may be disposed on the outer surface of the optical fibers. This configuration allows that the sheath layer may be extruded in contact with the optical fibers wherein the optical fibers do not adhere to the extruded material of the sheath layer.

By way of example, the sheath layer 21 may be extruded having an outer diameter of between 1.25 mm and 1.35 mm and having an inner diameter of between 1.0 and 1.05 mm. If twelve optical fibers are disposed within the core section as shown in the embodiment of FIG. 2 the sheath layer 21 is extruded around the optical fibers 11, 12 such that a free space of the cross sectional area of the core section which is not occupied by the optical fibers is between 30% to 40% of the total area of the cross section of the core section 10 which is surrounded by the sheath layer. In the configuration as shown in FIG. 2 the free space within the core section is for example reduced to 32%. That means that the area of the cross section of the core section 10 which is occupied by the optical fibers 11 and 12 is 68% of the total area of the cross section of the core section 10 which is surrounded by the inner surface of the sheath layer 21. The area occupied by the optical fibers can be greater then 68% in some embodiments.

The density by which the optical fibers are packed in the core section may also be characterized by the so called pull-out-force which specifies a force which is necessary to pull out the whole optical fiber bundle out of the core section of the optical transmission element. According to the embodiment of the fiber optic cable shown in FIG. 1 the pull-out-force which is necessary to pull the whole bundle of the optical fibers out of a section of an optical transmission element having a length of 1 m is between 0.4 N to 0.5 N. That means that the twelve optical fibers shown in FIG. 1 may be pulled out of the core section of the optical transmission element of the fiber optic cable by exerting a tensile force to the optical fibers which is between 0.4 N and 0.5 N.

In comparison to the low pull-out-force which is necessary to pull the optical fibers out of the core section of FIG. 1, the pull-out-force which is needed to pull out optical fibers being configured in a high packing density is between 3 N to 10 N. According to the embodiment of the optical transmission element as shown in FIG. 2 comprising twelve optical fibers, the pull-out-force to pull the fibers out of the core section is 5 N. The embodiment of an optical transmission element comprising optical fibers which are coupled to each other and also coupled to the surrounding sheath layer 21 allows to transmit data signals such as light signals parallel via the optical fibers with a temporal skew of less than 2.5 ps/m. That means that the time delay between the data signals transferred via the different optical fibers of an optical transmission element is less than 2.5 ps if a data transmission is considered via the optical fibers of the optical transmission element of a length of 1 m.

FIG. 3 shows an embodiment of an optical transmission element 200 of a fiber optic cable with optical fibers packed in the core section 10 of the optical transmission element with a high density. The core section comprises twelve optical fibers. The optical fibers are arranged such that three optical fibers 11 are surrounded by nine optical fibers 12 which is similar to the configuration of optical fibers as shown in FIG. 2. A sheath section 20 formed by a sheath layer 21 surrounds the core section 10 such that the fibers are in direct contact to each other and are also coupled to the material of the sheath layer 21.

The sheath layer 21 may be formed around the core section 10 by an extrusion process. As illustrated in FIG. 3, the sheath layer is extruded around the optical fibers 11, 12 such that the outer optical fibers 12 disposed closer to the sheath section 20 than the inner optical fibers 11 are embedded in the material of the sheath layer 21. The sheath layer 21 may be extruded around the optical fibers 11, 12 so that the outer diameter of the sheath layer is 1.30 mm and an inner diameter of the sheath layer is less than 1.05 mm.

The core section may be formed in a dry configuration so that the optical fibers are in contact which each other and are not embedded in a filler material. According to another embodiment the optical fibers 11, 12 may be embedded in a filler material, for example a gel. The gel prevents that forces which are exerted onto the sheath section 20 are transferred to the optical fibers. Furthermore, the gel has a water blocking capability so that in case of an ingress of water an expansion of water along the optical fibers within the core section is prevented.

According to the embodiments 100 and 200 of optical transmission elements of a fiber optic cable the sheath layer 21 may include a composition of material containing a mixture of ethyl methyl acetate, linear low density polyethylene, anorganic fillers and stabilizers. According to an embodiment of the fiber optic cable the mass ratio of the individual constituents of the material composition is 50% of ethyl methyl acetate, 8% of the linear low density polyethylene, 40% of anorganic fillers, such as magnesium hydroxide or chalk, and an amount of approximately 2% of stabilizers. The composition of material has a low melting temperature which is between 80° C. to 90° C. Since the melting temperature of the material of the optical fibers is higher than the melting temperature of the material of the sheath layer, an adhering between the optical fibers and the sheath layer during the extrusion process is prevented. Furthermore, the material of the sheath layer has a low elongation at break of 6 MPa so that the sheath layer may be easily stripped, for example by bare fingers, to expose the optical fibers without using special tools.

The optical fibers 11, 12 do not show any remarkable increase of attenuation even if a lateral pressure is affected to the sheath layer 21.

According to a first embodiment of the optical fibers, the optical fibers may have a diameter of about 250 μm and contain a light guiding core region 1 and a cladding region 2 surrounding the core region. The core region 1 and the cladding region 2 may be comprised of silica. The core region may also be silica doped with one or more dopants to provide a positive refractive index relative to pure silica.

FIG. 4 shows another embodiment of a fiber optic cable comprising microstructured optical fibers. According to the embodiment of the microstructured optical fibers, the core region 1 is hole-free whereas the cladding region 2 comprises an inner area 3 including a plurality of holes 5 and a hole-free outer area 4. The inner area 3 has for example a radial width which is not less than 0.5 μm and not larger than 20 μm. The hole-containing region may consist of undoped (pure) silica to achieve a decreased refractive index. The inner area 3 may also comprise doped silica, for example fluorine-doped silica, having a plurality of holes. The holes are for example stretched along the length, in a direction parallel to a longitudinal axis of the optical fiber, but do not extend the length of the entire fiber. The holes may include air or any other gas, for example an inert gas. The core region and the cladding region provide improved bend resistance so that the bend radius of the optical transmission element is down to 5 mm.

Figure 5A:
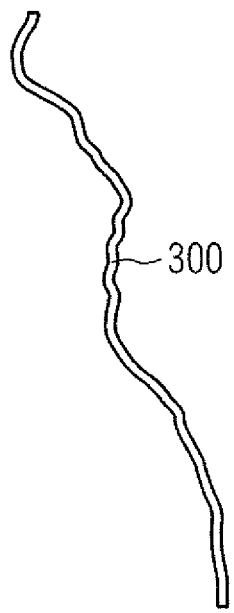
FIG. 5A illustrates a course of an embodiment of a single optical fiber pulled out of a core section of an optical transmission element.
Figure 5B:
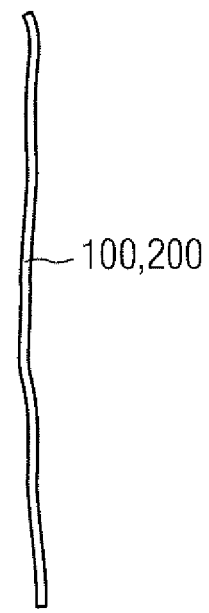
FIG. 5B illustrates a course of an embodiment of an optical transmission element.

FIG. 5A shows a conventional optical transmission element 300 comprising optical fibers which are loosely arranged within a core section of the optical transmission element. FIG. 5B shows an optical transmission element according to the embodiments 100, 200 comprising a sheath layer surrounding the optical fibers wherein the optical fibers are coupled by each other and wherein at least all of the outer optical fibers are directly in contact with the sheath layer. Due to the high packing density the optical fibers of the optical transmission element of FIG. 5B are arranged within the core section of the optical transmission element in a straight manner so that microbendings between the individual optical fibers are significantly reduced in comparison to a loose arrangement of the optical fibers.

In contrast to the straight course of the optical transmission element of FIG. 5B, the optical fibers of the optical transmission element illustrated in FIG. 5A has more bendings within the core section due to the loose arrangement of the optical fibers so that the optical transmission element of FIG. 5A shows a wave-shaped course. Due to the reduced microbendings of the optical fibers within the core section of the optical transmission element of FIG. 5B, the optical fibers have a fewer optical length variation and a fewer geometrical length variation in comparison to an optical transmission element wherein the optical fibers are loosely arranged so that a distance is provided between the optical fibers and the surrounding sheath layer.

Figure 6A:
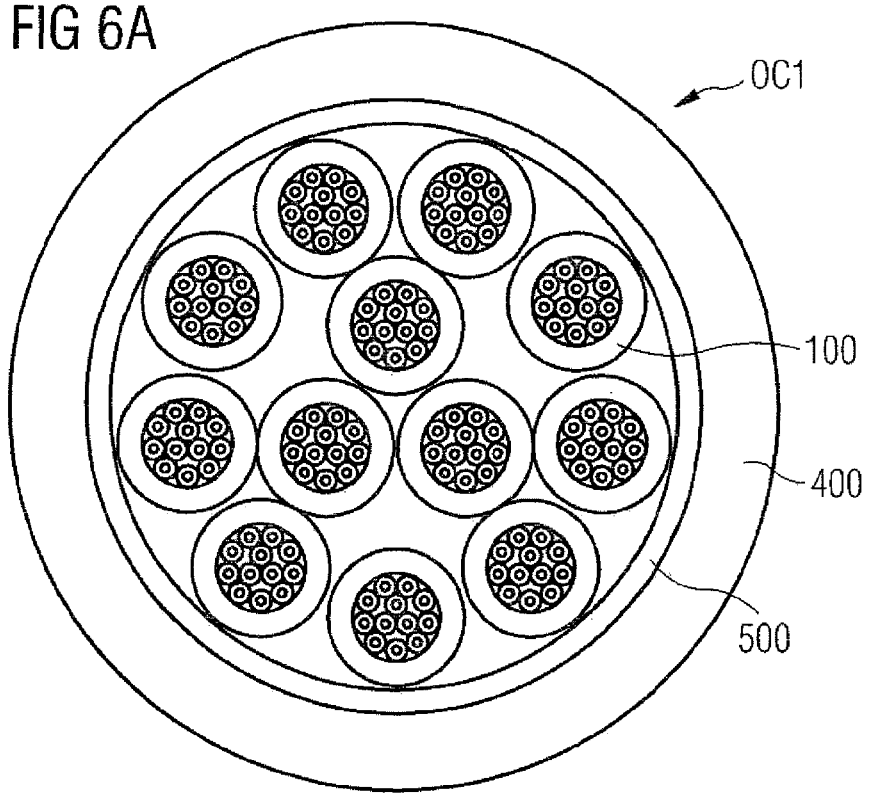
FIG. 6A illustrates a course of an embodiment of an optical transmission element.

FIG. 6A shows an embodiment of a fiber optic cable OC1 comprising optical transmission elements 100. According to the embodiment of the fiber optic cable shown in FIG. 6A the cable comprises twelve optical transmission elements. The optical transmission elements are surrounded by a thermoplastic cable jacket 400. A layer of strength member elements 500, such as yarns, is disposed between the optical transmission elements 100 and the cable jacket.

Figure 6B:
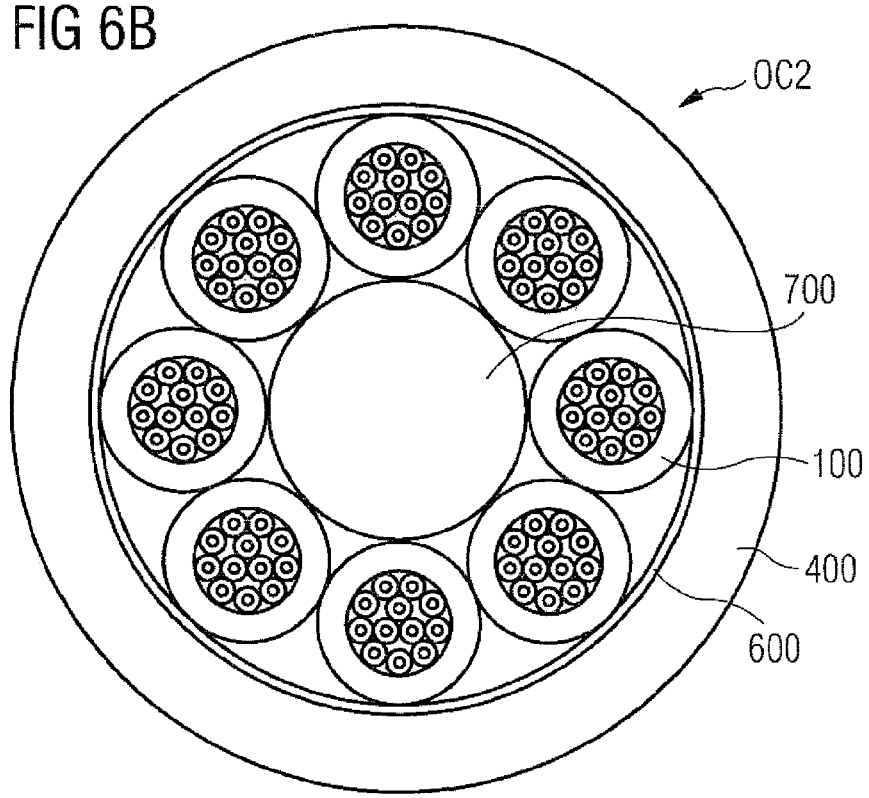
FIG. 6B illustrates an embodiment of a fiber optic cable comprising optical transmission elements.

FIG. 6B illustrates another embodiment of a fiber optic cable OC2. Optical transmission elements 100 are disposed around a central strength member element 700. A thin layer of a non-woven material 600 is disposed around the optical transmission elements 100. The layer of the non-woven material may comprise water-swellable powder. A cable jacket 400 is extruded around the non-woven material.

Figure 7A:
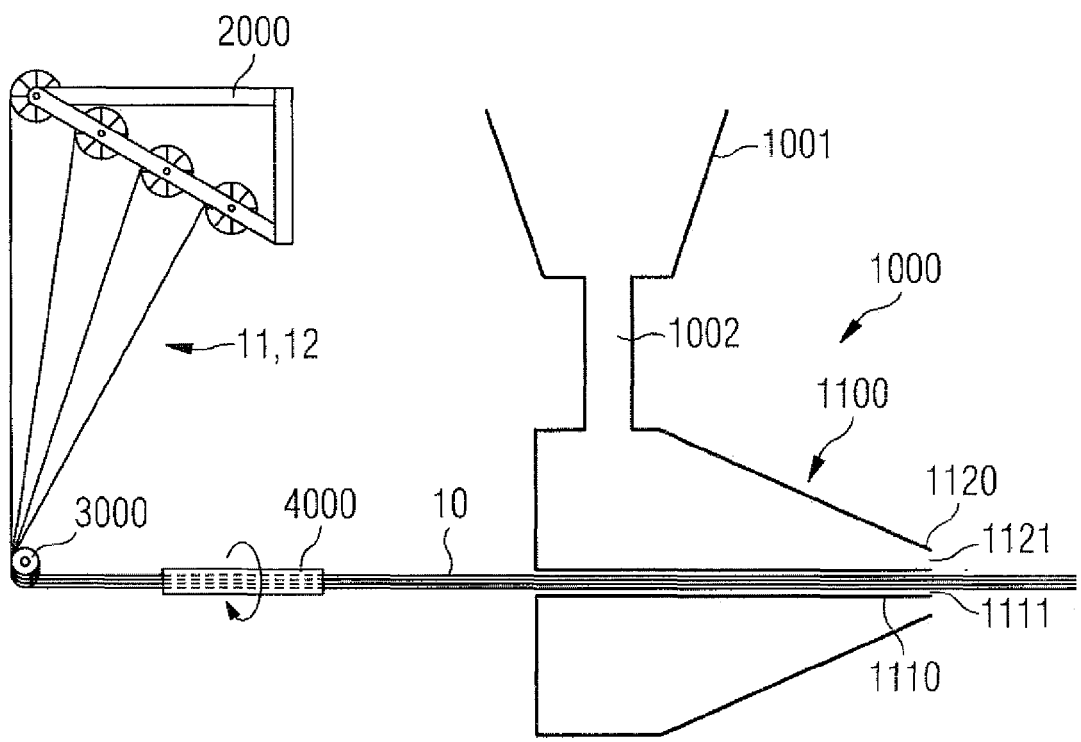
FIG. 7A illustrates an embodiment of an extruder for manufacturing an optical transmission element.

FIG. 7A illustrates a production line for manufacturing the optical transmission element of the fiber optic cable. The optical fibers are provided rolled up on respective coils of a storage unit 2000. For reasons of simplicity, only four coils are shown in FIG. 7A. In order to manufacture a fiber optic cable comprising optical transmission elements, as shown in FIGS. 2 and 3, the production line comprises further eight coils on which the other optical fibers are stored. The optical fibers may be guided to an extruder 1000 via a deflection roller 3000. The optical fibers may be arranged in the core section of the optical transmission element in an unstranded manner. According to another embodiment of the fiber optic cable the optical fibers may be stranded in the stranding device 4000 and subsequently may be transported to the extruder 1000.

The extruder 1000 comprises a tank 1001 to heat a material provided for extruding around the core section of the optical transmission element. The core section 10 is formed by the optical fibers. After heating the thermoplastic material in the tank 1001 the melted material is transported via a conveyor 1002 to a conical-shaped nozzle 1100 of the extruder. The nozzle comprises an opening 1111 through which the optical fibers 11, 12 are transported. The nozzle 1100 further comprises an opening 1121 to extrude the heated thermoplastic material around the core section 10 of the optical transmission element.

Figure 7B:
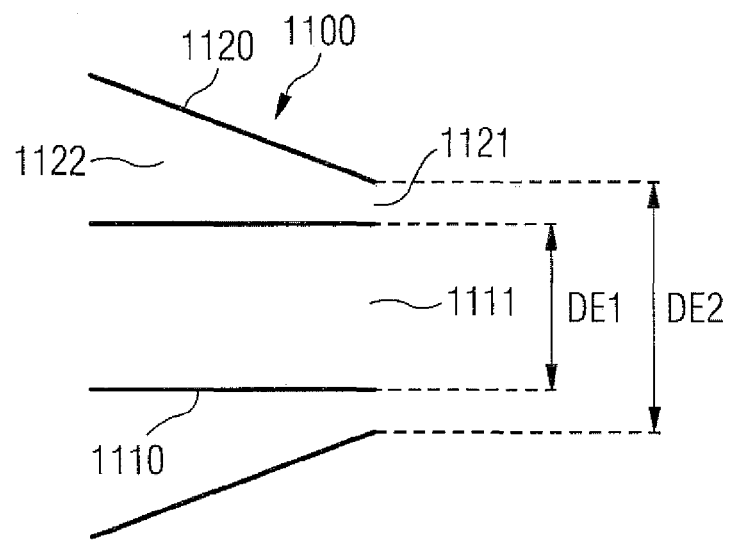
FIG. 7B illustrates an embodiment of a nozzle of an extruder provided to manufacture an optical transmission element.

The nozzle is configured so that the material of the sheath layer is extruded in contact with the optical fibers. FIG. 7B shows the nozzle 1100 of the extruder 1000 in an expanded view 1100 to illustrate the assembly and the dimensions of the individual components of the nozzle.

The nozzle comprises an inner tube 1110 having a diameter DE1 and an outer tube 1120 surrounding the inner tube. The outer tube 1120 is conically shaped. The inner tube 1110 has an opening 1111 having a diameter DE1 through which the optical fibers are transported when the thermoplastic material stored in the tank 1001 is extruded around the core section of the optical transmission element. The diameter of the outer tube 1120 is larger than the diameter DE1 of the inner tube 1110. The outer tube 1120 has an opening 1121 having a diameter DE2 so that a slit is formed between the the inner tube and the outer tube.

The optical fibers are guided within the inner tube 1110 and leave the nozzle at the opening 1111. The material of the sheath layer is guided in an area 1121 between the inner and the outer tube. In order to manufacture the optical transmission element so that the diameter of the sheath section 20 of the optical transmission element is small in a manner such that the optical fibers are packed in contact which each other within the core section 10 and are also in contact with the material of the sheath layer 21 the relation between the diameter DE1 and the diameter DE2 is between 1.5:2.1 and 1.5:2.5. The nozzle may be provided for example with a diameter DE1 of the inner tube 1110 of 1.5 mm. The outer tube 1120 may be provided with an opening having a diameter DE2 between 2.1 mm and 2.5 mm.

Another feature of the extruder may be obtained if a first quotient is formed between the diameter DE2 and the diameter DE1 and if a second quotient is formed between the outer diameter DT2 of the sheath layer 21 and the diameter DT1 of the core section of the optical transmission element, as illustrated in FIG. 2. According to an embodiment of the nozzle, the diameter DE1 of the inner tube 1110 and the diameter DE2 of the opening 1121 of the outer tube 1120 of the extruder is determined so that a relation of the first quotient and the second quotient is bigger than 1.0, and preferably in a range of between 1.1 and 1.3. The relation of the first and section quotient is usually denoted as the so called draw balance. It has been found by the inventors that a relation of the draw balance in a range between 1.1 and 1.3 ensures that each of the optical fibers is coupled to at least two other ones of the optical fibers, and that the optical fibers are also coupled to the sheath layer when the sheath layer is extruded around the optical fibers.

The fiber optic cable which is manufactured by an extruder being configured with the dimension of the inner tube 1110 and the dimension of the opening of the outer tube 1120 of the nozzle 1100 as specified above allows to manufacture a fiber optic cable comprising optical transmission elements comprising optical fibers, for example twelve optical fibers, which are included in a core section of each of the optical transmission elements of the fiber optic cable with a high packing density. Each of the optical fibers is in contact with at least two other ones of the optical fibers, and the outer optical fibers are in contract with the surrounding sheath layer so that microbendings of the optical fibers within the core section are avoided. The optical fibers of the optical transmission element have an optical length variation of less than 0.05% per meter which leads to a skew of time delays of signals transmitted via the individual optical fibers packed within the core section of less than 2.5 ps per meter. A fiber optic cable comprising optical transmission elements according to the embodiments of FIGS. 2 and 3 allows a high speed data transmission wherein bits are transmitted parallel via the individual optical fibers. The fiber optic cable is therefore especially suited to be used for connecting servers in data centers.

Although the present optical transmission element and the method for manufacturing the optical transmission element have been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present optical transmission element and the method for manufacturing the optical transmission element and are intended to be covered by the appended claims. It will also be apparent to those skilled in the art that various modifications and variations can be made to the present optical transmission element and the method for manufacturing without departing from the spirit and scope of the optical transmission element and the method to manufacture. Thus, it is intended that the present optical transmission element and the method for manufacturing the optical transmission element cover the modifications and variations of the optical transmission element and the method for manufacturing provided they come within the scope of the appended claims and their equivalents.

What is claimed is:

1. An optical transmission element, comprising:
    a core section including a plurality of optical fibers, wherein each one of the optical fibers is in contact with at least two other ones of the optical fibers; and
    a sheath section comprising a sheath layer surrounding the core section such that the sheath layer is in contact with the optical fibers;
    wherein the optical fibers have an optical length variation of less than 0.05%/m, and wherein the optical fibers are arranged in the core section such that a time delay between optical signals transferred via different ones of the optical fibers is lower than 2.5 ps/m.

2. The optical transmission element of claim 1, wherein first ones of the optical fibers are surrounded by second ones of the optical fibers, and the sheath layer is in contact with the second ones of the optical fibers.

3. The optical transmission element of claim 2, wherein:
    the sheath layer is disposed around the core section by an extrusion process performed by an extruder comprising a nozzle having an inner tube and an outer tube surrounding the inner tube;
    the inner tube has an opening with a first diameter and the outer tube has an opening with a second diameter; and
    a relation between the first diameter and the second diameter is between 1.5:2.1 and 1.5:2.5.

4. The optical transmission element of claim 2, wherein the sheath layer has an outer diameter of between 1.25 mm and 1.35 mm and an inner diameter of between 1.00 mm and 1.10 mm.

5. The optical transmission element of claim 4, wherein the core section includes a gel or a material of chalk or a water-swellable material.

6. The optical transmission element of claim 4, wherein the sheath layer contains a composition of material including ethyl methyl acetate, linear low density polyethylene, anorganic fillers and stabilizers.

7. The optical transmission element of claim 4, wherein a force which is needed to pull the optical fibers out of the core section of a segment of the optical transmission element of 1 m is between 3 N to 10 N.

8. The optical transmission element of claim 4, wherein the core section comprises twelve optical fibers, and wherein the sheath layer surrounds the optical fibers such that an area occupied by the optical fibers is 68% of the area of the diameter surrounded by the sheath layer.

9. The optical transmission element of claim 1, wherein the sheath layer has an outer diameter of between 1.25 mm and 1.35 mm.

10. The optical transmission element of claim 9, wherein the sheath layer has an inner diameter of between 1.00 mm and 1.10 mm.

11. The optical transmission element of claim 1, wherein the sheath layer contains a composition of material including ethyl methyl acetate, linear low density polyethylene, anorganic fillers and stabilizers.

12. The optical transmission element of claim 1, wherein a force which is needed to pull the optical fibers out of the core section of a segment of the optical transmission element of 1 m is between 3 N to 10 N.

13. The optical transmission element of claim 1, wherein the core section comprises twelve optical fibers, and wherein the sheath layer surrounds the optical fibers such that an area occupied by the optical fibers is 68% or more of the area of the diameter surrounded by the sheath layer.

14. An optical transmission element, comprising:
    a core section including a plurality of optical fibers, wherein each one of the optical fibers is in contact with at least two other ones of the optical fibers; and
    a sheath section comprising a sheath layer surrounding the core section such that the sheath layer is in contact with the optical fibers, wherein the optical fibers which are coupled to each other and also coupled to the surrounding sheath layer, thereby facilitating transmission of data signals via the optical fibers with low temporal skew.

15. The optical transmission element of claim 14, wherein the time delay between the data signals transferred via the different optical fibers of an optical transmission element is less than 2.5 ps if a data transmission is considered via the optical fibers of the optical transmission element of a length of 1 m.

16. The optical transmission element of claim 15, wherein outer optical fibers of the plurality of optical fibers, disposed closer to the sheath section than inner optical fibers, are embedded in material of the sheath.

17. The optical transmission element of claim 15, wherein the optical fibers of the optical transmission element are arranged within the core section of the optical transmission element in a straight manner such that microbending between individual optical fibers of the plurality are significantly reduced in comparison to a loose arrangement of the optical fibers.

* * * * *